J. W. Murfee.
Plow.
No. 3,616. Reissued Aug. 24, 1869.
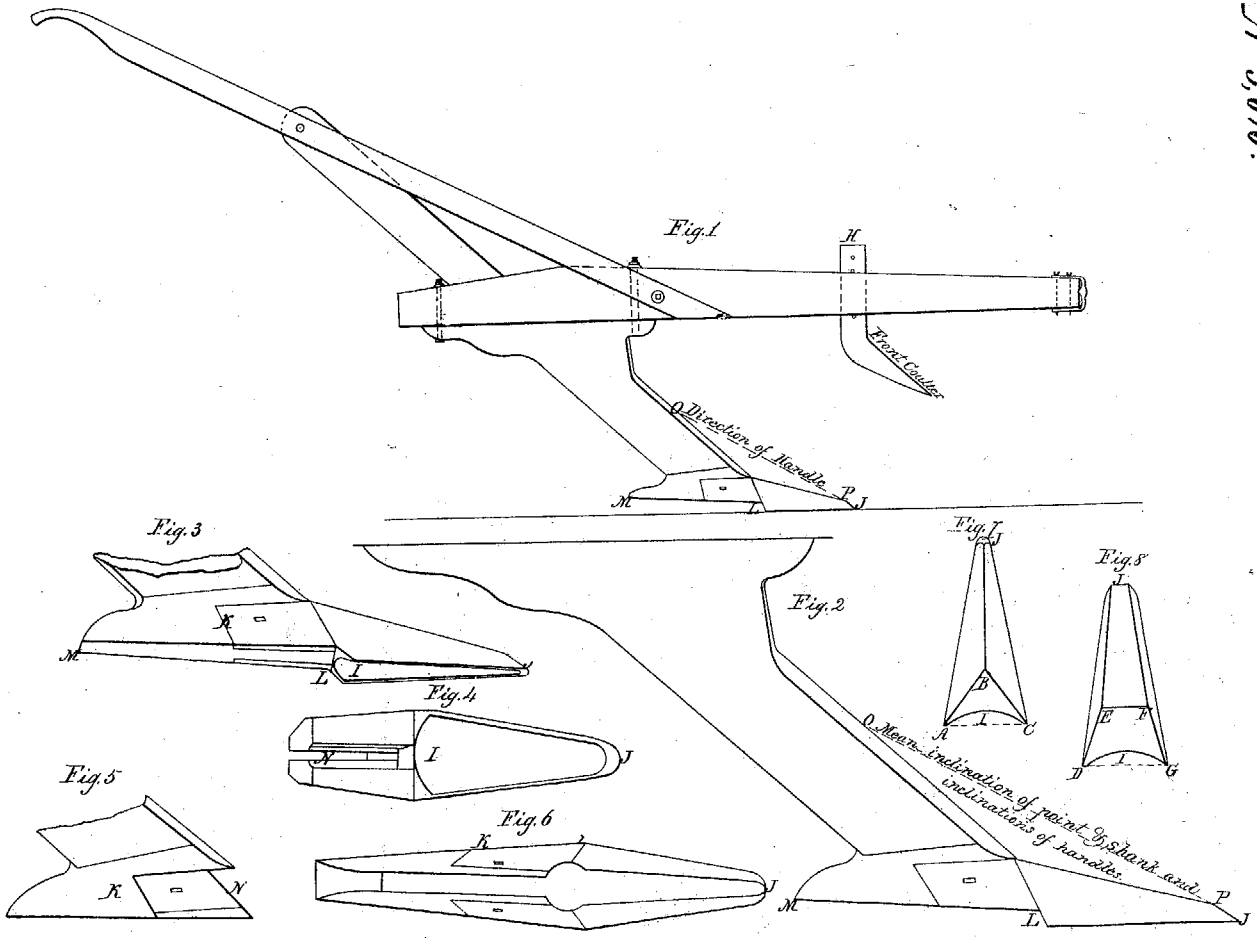
Witnesses
P. Bryce
Thos. Murfee
Inventor
Jas W. Murfee
N. PETERS, PHOTO-LITHOGRAPHER, WASHINGTON, D. C.

UNITED STATES PATENT OFFICE.

JAMES W. MURFEE, OF HAVANNA, ALABAMA.

IMPROVEMENT IN SUBSOIL-PLOWS.

Specification forming part of Letters Patent No. 91,657, dated June 22, 1869; Reissue No. 3,616, dated August 24, 1869.

*To all whom it may concern:*

Be it known that I, JAMES W. MURFEE, of Havanna, in the county of Hale and State of Alabama, have invented a new and useful Improvement in Subsoil-Plows; and I do hereby declare that the following is a full, clear, and exact description thereof, which will enable others skilled in the art to make and use the same, reference being had to the accompanying drawings, forming part of this specification.

Figure 1 is a side elevation of a subsoil-plow and frame. Fig. 2 is a side elevation of the shank and point. Fig. 3 is an under perspective view of the heel and point. Fig. 4 is a perspective view of the point and socket. Fig. 5 is a view of the heel and tenon. Fig. 6 is a horizontal projection of heel and point. Fig. 7 is an end perspective view of the triangular point. Fig. 8 is an end perspective of the quadrangular point. Fig. 7, at A B C, is a transverse section of triangular point. Fig. 8, at D E F G, is a transverse section of quadrangular point.

Similar letters of reference indicate corresponding parts.

My invention consists in an arrangement of a horizontal concavo-convex wedge-shaped share (point or hoe) for plowing and pulverizing the earth, driven horizontally through the ground by being attached to an inclined knife-edged cutting-colter, which colter is attached to the beam of the plow. The colter is set as acutely with the horizon as practicable—that is, varying from forty-five degrees to fifty-five degrees, more or less, according to the size of the plow, the smallest size having the lowest angle—so as to approach the line of the axis of the plow or hoe as near as may be, and the power is applied thereby as nearly in the direction of the axis of the wedge as possible. The standard of the frame is a continuation of the line of the colter-shank as near as practicable, and the angle which the handles make with the horizon or base of the plow-point should, as near as practicable, be a mean of the angles which the top of the point and front edge of the colter-shank make with the horizon, so that any power applied in the direction of the handles by the plowman will have the greatest effect on the point and shank. The point is made of wrought or cast metal, and in shape is a concavo-convex pyramid, the upper (convex) surface being composed of two, three, or more triangular planes, more or less inclined to each other, one or more of them being inclined to the horizon, forming a pyramidal surface. Two forms of these pyramids, differing from each other only in the number of faces, are shown in Figs. 7 and 8; and it is obvious that as Fig. 8 differs from Fig. 7 only in having more faces, so by continuing to increase the number of angles other forms may be produced indefinitely, preserving under all circumstances the convexity of the upper surface and the concavity of the under surface of the point, and I regard all these forms as equivalents of Figs. 7 and 8. The apex in any case is slightly beveled, as shown in the figures at J. The axis of the pyramid or cone is coincident with the plane of the lower edges, which run parallel with the horizon. The lower side of the pyramid or conical wedge (the concave surface) is hollowed out or arched, as shown at I in the drawings, so as to make a hollow cone for the escape of the earth after being cut. The edges between the upper (convex) and the lower (concave) surfaces on which the plow runs are as near feather-edges as practicable, thus forming knife-edges which cut the earth, and on which the plow runs as on skates, while the earth has an easy escape under the hollow or arch, reducing the friction to a minimum, and by these means the plow is made a perfect self-sharpener, wearing itself almost entirely out before it needs renewing. A point thus constructed can be applied to any common mold or other plow simply by providing it with the ordinary means of attachment to the plow.

The rear of the plowshare (heel) is a reversed truncated wedge, K. The base of this heel starts to the rear from L, the highest point of the hollow under the "point," and is elevated as it proceeds to the rear M. The heel may be built on the colter-shank and the point can be attached thereto by a mortise and-tenon joint and key, as at N, by bolts and screws or by any other ordinary mode of attachment.

In wrought-metal, the heel, point, and shank may be forged together or made separately, as above described.

The cutting-colter shank is made of metal, with wedge or knife edge to the front, expanded and thickened at the beam or top end, so as to form braces, and is attached to the beam by common bolts and screws. The angle which this colter-shank makes with the beam in front is as acute as practicable. The lower end of this colter-shank is so attached to the plow-hoe (point and heel) as to make the lower side of the point (base) set true on the horizontal plane. The upper end of the colter-shank is so aligned as to give the beam a small inclination above the horizon when the plow-point is sitting on its base.

The beam of the frame is made of wood or metal and the handles are of wood. The standard and handles are set as before mentioned.

The smaller forward cutting-colter, H, is made of wrought or cast metal, (iron or steel.) The shank of this colter is perpendicular to the beam, and the cutting or lower part is made knife-like, the front edge setting parallel to the front end of the colter-shank.

The operation is as follows: The point of the plow (share) or hoe acts in the ground as a wedge does in wood, splitting and breaking the earth into pieces, pulverizing it extensively. This subsoil-plow may be constructed so as to run from twelve to twenty-four inches deep. The lower side of the wedge being hollowed (or arched) and beveled, so as to produce sharp edges, cuts the earth like a knife, and the plow running upon these edges the friction is reduced to a minimum. The earth escapes easily under the hollow (arch) of the point and under the inclined heel. The sides of the heel being made of a truncated wedge reversed, diminishes the friction and acts like the sharp after-part of a ship or vessel in the water. The power applied to drive a wedge acts with the greatest effect when applied in the direction of the axis of the wedge, which direction in this case is horizontal, and the power being applied in the direction of and along the axis of the colter-shank, it follows that since the direction of the shank is as nearly in this line as practicable, the power in this plow is applied in the most effective direction practicable.

The colter-shank *o*, being knife-edged, cuts the ground easily, and being set at an acute angle acts as a powerful inclined plane. The beam being set so as to make a very small angle with the axis of the wedge, just sufficient to keep the plow in the ground, the wedge is drawn through the earth parallel with the general surface. These peculiar wedge upper surfaces and the peculiar under hollow (arch) and knife edges tend to keep the plow in the ground and allow the beam to be set more nearly parallel to the axis of the plow-wedge. The smaller advanced (forward) cutting-colter H, being set to cut pointedly and in front of the plow-point, relieves the pressure upon the plow-point and makes the passage of the plow easier.

The plow may be worked with or without the cutting-colter.

The standard of the frame being as near in the line of the colter-shank as practicable, as above described, any power applied by the plowman through the handles, down the standard, acts down the colter-shank on the wedge and assists the team. Now, the handles being set near the mean angle of the colter-shank and wedge, and as nearly parallel to both at the same time as practicable, all the power exerted by the plowman on and in the direction of these handles (levers) will act equally upon the colter-shank and wedge and further assist the team. The same force of the plowman which applied to handles assisted in driving the plow forward will, when reversed, enable the plowman to withdraw the plow easily from the earth when obstructed.

Having thus described my invention, what I claim as new, and desire to secure by Letters Patent, is—

1. The wedge-shaped concavo-convex share, hoe, or point herein described, the upper (convex) side being composed of inclined triangular surfaces, the under (concave) side in all cases being arched, and beveled so as to form, as nearly as the kind of metal used will allow, feather-edges upon the sides and point, reducing the friction to a minimum, thus allowing the plow to pass through the earth as easily as possible, and by these means making the plow a self-sharpener, substantially as specified.

2. The reversed truncated wedge-shaped heel, elevated toward the rear, substantially as specified.

3. The arrangement and set of the colter-shank in rear of the greatest transverse diameter of the wedge, and as acutely as practicable thereto, substantially as described.

4. The arrangement of the standard of the frame as near in a line with the colter-shank as practicable, and the handles parallel to a line which in direction is a mean between the line of the shank and point, or nearly so, substantially as specified.

5. The herein-described share or point, either separately or in combination with an elevated heel, as specified.

6. The peculiar set and arrangement of the colter-shank, standard, of frame-handles, and beam, substantially as herein specified.

JAS. W. MURFEE.

Witnesses:
C. A. PETTIT,
SOLON C. KEMON.